(12) United States Patent
Kosaka

(10) Patent No.: US 7,181,337 B2
(45) Date of Patent: Feb. 20, 2007

(54) TRAVEL ASSIST SYSTEM

(75) Inventor: Yuji Kosaka, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/342,607

(22) Filed: Jan. 31, 2006

(65) Prior Publication Data

US 2006/0184307 A1    Aug. 17, 2006

(30) Foreign Application Priority Data

Feb. 17, 2005    (JP) .............................. 2005-039982

(51) Int. Cl.
*G06F 19/00* (2006.01)
*G01C 21/00* (2006.01)

(52) U.S. Cl. ........................ 701/110; 701/22

(58) Field of Classification Search ................ 701/110, 701/114, 102, 22, 26, 29
See application file for complete search history.

(56) References Cited

U.S. PATENT DOCUMENTS 6,484,088 B1    11/2002    Reimer
6,864,807 B2 *    3/2005    Todoriki et al. ............. 701/22
2005/0055157 A1    3/2005    Scholl

FOREIGN PATENT DOCUMENTS

| GB | 2390438 A |   | 1/2004 |
|---|---|---|---|
| JP | 6-195594 A | * | 7/1994 |
| JP | 2002-202013 |   | 7/2002 |
| JP | 2002-202013 A | * | 7/2002 |
| JP | 2004-151053 |   | 5/2004 |

OTHER PUBLICATIONS

UK Search Report dated May 30, 2006.

* cited by examiner

*Primary Examiner*—Hieu T. Vo
(74) *Attorney, Agent, or Firm*—Nixon & Vanderhye P.C.

(57) ABSTRACT

A travel assist system searches a nearest service station based on navigation information and predicts a quantity of aqueous urea solution consumed until the service station is reached. If a quantity of the remaining aqueous urea solution is not greater than the aqueous urea solution consumption at least by a predetermined value, a warning is provided to a user. Control conditions of an internal combustion engine (diesel engine) enabling the vehicle to reach the service station without running short of the aqueous urea solution are calculated. An exhaust gas recirculation quantity is increased based on the calculation result. Thus, nitrogen oxides contained in the exhaust gas is reduced and a consumption of the aqueous urea solution is reduced.

13 Claims, 10 Drawing Sheets

TRAVEL ASSIST SYSTEM

CROSS REFERENCE TO RELATED APPLICATION

This application is based on and incorporates herein by reference Japanese Patent Application No. 2005-39982 filed on Feb. 17, 2005.

BACKGROUND OF THE INVENTION

1. Field of the Invention

The present invention relates to a travel assist system that manages a supplied material consumed through running of a vehicle and supplied at a supply point.

2. Description of Related Art

A travel assist system described in JP-A-2004-151053 determines whether a vehicle can travel to a destination point based on a remaining quantity of fuel of a vehicular motor and an average fuel consumption rate (average fuel consumption) in a running period. If it is determined that the vehicle cannot travel to the destination point, the travel assist system indicates positional information of a reachable fuel supply point. The travel assist system guides the vehicle to the supply point when it is determined that the vehicle cannot travel to the destination point. Accordingly, fuel can be replenished at the supply point and the vehicle can travel to the destination point.

The fuel consumption rate of the vehicle varies depending on driving propensity of a user (driver). The above-mentioned travel assist system calculates a distance, through which the vehicle can travel, based on the average fuel consumption in the running period. Therefore, the distance reflects the driving propensity of the user. Accordingly, if the driving propensity of the user varies, the supply point indicated by the travel assist system will vary. Thus, there is a possibility that the reachable supply point is excluded from guided points depending on a driving manner.

Thus, there is a room for improvement in the conventional travel assist system with regard to the travel assist for assisting the vehicle to travel to the fuel supply point.

There is a room for improvement also in a travel assist system that manages a supplied material consumed in running of a vehicle and supplied at a supply point, with regard to travel assist for assisting the vehicle to travel to the supply point.

SUMMARY OF THE INVENTION

It is therefore an object of the present invention to provide a travel assist system capable of suitably assisting a vehicle to travel to a supply point.

According to an aspect of the present invention, a travel assist system that manages a supplied material consumed through running of a vehicle and supplied at a supply point includes a calculating device that calculates an operating condition of the vehicle enabling the vehicle to reach the supply point without running short of the supplied material based on information about a running condition between the supply point and the vehicle and a quantity of the supplied material remaining in the vehicle operation of the vehicle reflects driving propensity of a user. Therefore, a quantity of the supplied material necessary to run the vehicle to the supply point will vary depending on the driving propensity of the user.

The above-mentioned travel assist system calculates the operating condition of the vehicle enabling the vehicle to reach the supply point. Accordingly, the travel assist system can suitably assist the vehicle to travel to the supply point independently of the driving propensity of the user.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

A travel assist system according to a first example embodiment of the present invention will be explained with reference to FIGS. 1 to 6.

Figure 1:
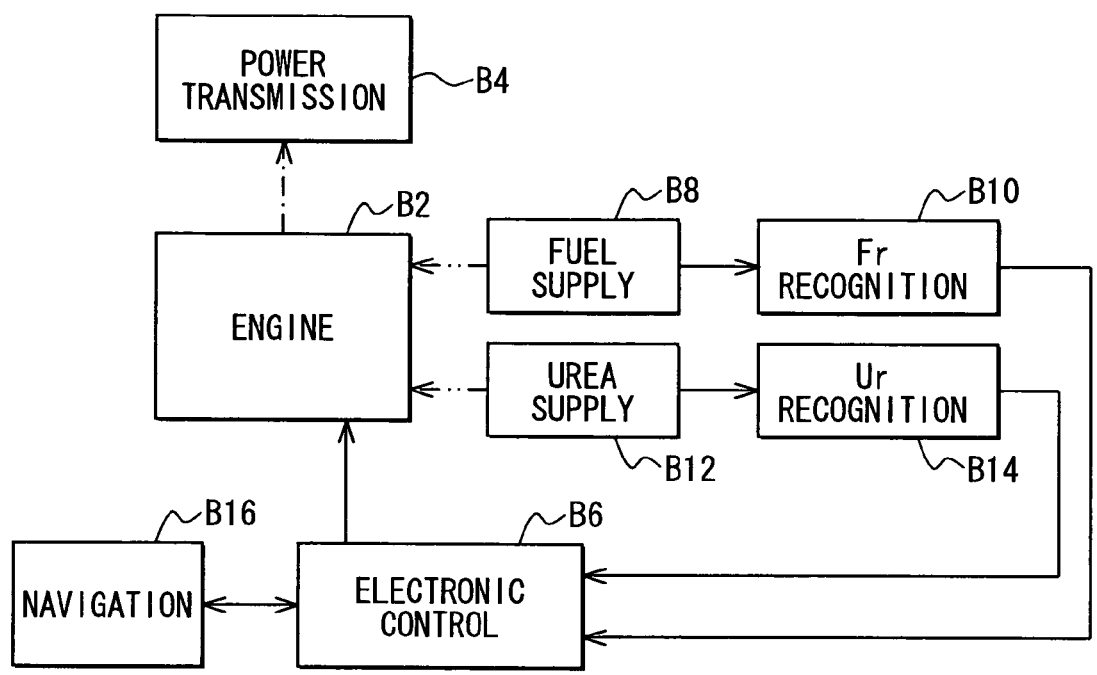
FIG. 1 is a block diagram showing a structure in a vehicle including a travel assist system according to a first example embodiment of the present invention.

Referring to FIG. 1, a travel assist system and its peripheral devices according to a first example embodiment applied to a vehicle having a diesel engine is illustrated.

As shown in FIG. 1, a diesel engine (internal combustion engine) B2 as a motor of the vehicle applies a driving force to the vehicle through a power transmission B4. An electronic control device B6 having a central processor, a memory and the like controls output characteristics of the engine B2. A fuel supply device B8 supplies fuel (diesel oil) to the engine B2. A fuel remaining quantity recognition device B10 monitors a fuel quantity Fr stored in the fuel supply device B8. The fuel remaining quantity recognition device B10 outputs a sensed value of the fuel quantity Fr stored in the fuel supply device B8 to the electronic control device B6. An aqueous urea solution supply device B12 supplies aqueous urea solution to the engine B2 to purify nitrogen oxides contained in exhaust gas. An aqueous urea solution remaining quantity recognition device B14 monitors a quantity Ur of the aqueous urea solution stored in the aqueous urea solution supply device B12. The aqueous urea solution remaining quantity recognition device B14 outputs a sensed value of the quantity Ur of the aqueous urea solution stored in the aqueous urea solution supply device B12 to the electronic control device B6.

A navigation system B16 has a function of GPS (Global Positioning System) to sense a present position of the vehicle, a function of VICS (Vehicle Information and Communication System) to receive road traffic information from an information provision source, a function to output the information about the present position of the vehicle or the road traffic information to the electronic control device B6 or the user, and the like.

Next, a structure of the engine B2 and the electronic control device B6 will be explained in detail with reference to FIG. 2.

Figure 2:
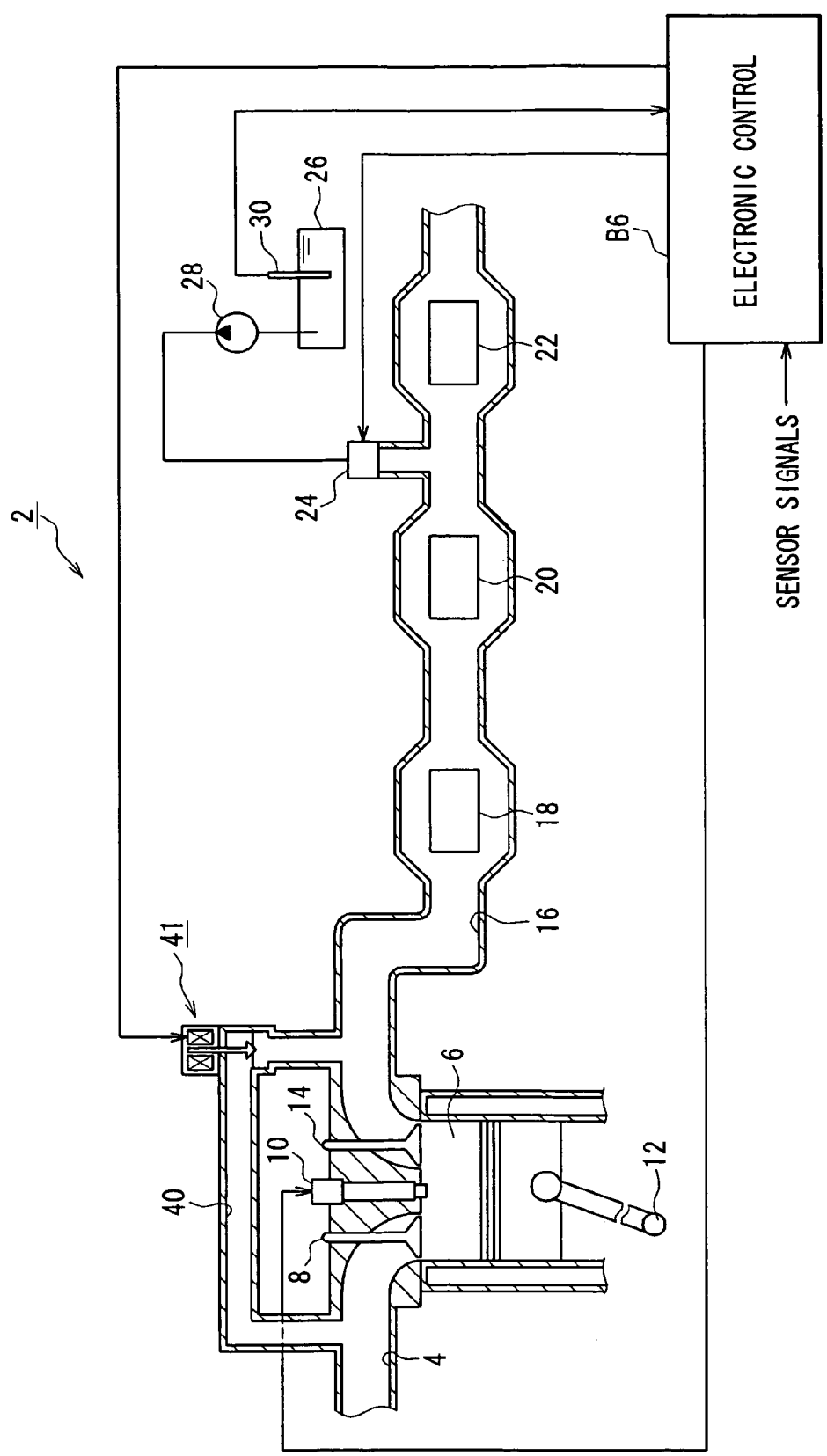
FIG. 2 is a diagram showing an internal combustion engine and an electronic control device according to the FIG. 1 embodiment.

As shown in FIG. 2, an intake passage 4 and a combustion chamber 6 communicate with each other in the engine 2 (engine B2 in FIG. 1) if an intake valve 8 opens. A fuel injection valve 10 is provided in the combustion chamber 6 so that the fuel injection valve 10 protrudes into the combustion chamber 6. A gas mixture of air suctioned into the combustion chamber 6 through the intake passage 4 and fuel injected from the fuel injection valve 10 is combusted to apply a driving force to an output shaft 12. The gas mixture having undergone the combustion is discharged to an exhaust passage 16 if an exhaust valve 14 opens. An oxidation catalyst 18, a nitrogen oxides storage catalyst (NOx storage catalyst) 20, and a selective reduction catalyst 22 are placed in the exhaust passage 16 in that order from an upstream side.

The oxidation catalyst 18 may be formed by applying a mixture of platinum and aluminum oxide to a metal support that is made of stainless steel.

The NOx storage catalyst 20 oxidizes nitrogen oxides (NOx) contained in the exhaust gas into nitrate and stores the NOx in the state of the nitrate when oxygen concentration in the exhaust gas is high. The NOx storage catalyst 20 decomposes the NOx and discharges the decomposed matters.

The selective reduction catalyst 22 purifies the NOx in the exhaust gas by using ammonia. An injection nozzle 24 for injecting the aqueous urea solution into the exhaust passage 16 is located upstream of the selective reduction catalyst 22 (in particular, between the NOx storage catalyst 20 and the selective reduction catalyst 22). The aqueous urea solution drawn up by a pump 28 from an aqueous urea solution tank 26 is supplied to the injection nozzle 24. The aqueous urea solution supply device B12 shown in FIG. 1 includes the injection nozzle 24, the aqueous urea solution tank 26 and the pump 28. An aqueous urea solution sensor 30 senses the quantity Ur of the aqueous urea solution remaining in the aqueous urea solution tank 26 and outputs the sensed value to the electronic control device B6. The aqueous urea solution remaining quantity recognition device B14 shown in FIG. 1 includes the aqueous urea solution sensor 30.

The engine 2 further includes an exhaust gas recirculation system. The exhaust gas recirculation system includes an exhaust gas recirculation passage 40 for connecting the exhaust passage 16 with the intake passage 4 and an exhaust gas recirculation valve (EGR valve) 41 for regulating a flow passage area of the exhaust gas recirculation passage 40. The EGR valve 41 regulates a quantity of the exhaust gas recirculated to the intake passage 4 through the exhaust gas recirculation passage 40.

The electronic control device B6 receives the sensed value from the aqueous urea solution sensor 30, sensed values from various sensors sensing operating states or operation environment of the engine 2, and a sensed value from a sensor sensing a manipulation amount of an accelerator pedal, for example. The electronic control device B6 operates various actuators of the engine 2 based on these sensed values to control output characteristics of the engine 2.

Specifically, in this example embodiment, the injection nozzle 24 is operated to purify the NOx contained in the exhaust gas by using the selective reduction catalyst 22.

Figure 3:
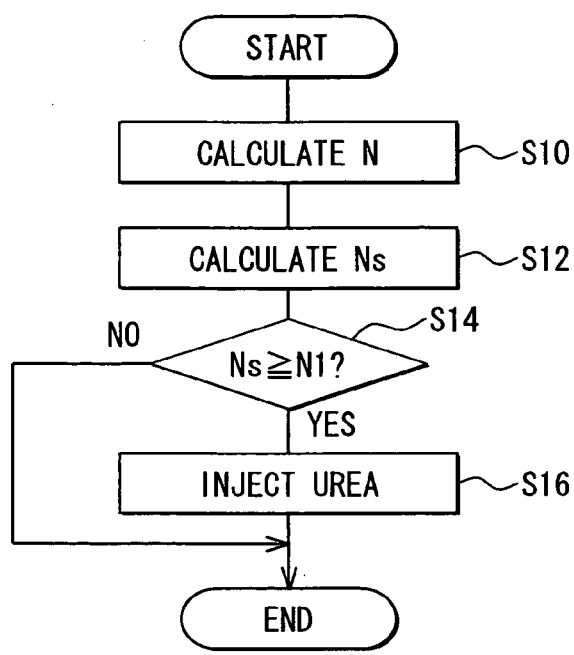
FIG. 3 is a flowchart showing processing steps of nitrogen oxides purification according to the FIG. 1 embodiment.

Processing steps for purifying the exhaust gas using the selective reduction catalyst 22 is shown by a flowchart of FIG. 3. The electronic control device B6 repeatedly performs the processing shown by the flowchart of FIG. 3 in a predetermined cycle, for example.

First in this series of processing, at Step S10, a production quantity N of the NOx is estimated (calculated) based on rotation speed of the output shaft 12 of the engine 2 and a fuel quantity injected from the fuel injection valve 10. The production quantity N of the NOx correlates with the rotation speed and the fuel injection quantity of the engine 2. Therefore, the production quantity N of the NOx is estimated (calculated) from these two parameters. For example, a two-dimensional map containing the rotation speed and the fuel injection quantity of the engine 2 as independent variables and the production quantity N of the NOx as a dependent variable is made based on data obtained through experimentation and the like. The two-dimensional map is stored in the electronic control device B6 beforehand. The electronic control device B6 calculates the production quantity N of the NOx through map calculation using the map.

Then, at following Step S12, a quantity Ns of the NOx stored in the NOx storage catalyst 20 shown in FIG. 2 is estimated (calculated) based on the production quantity N of the NOx calculated at Step S10. An integrated value of the production quantity N of the NOx may be calculated as the quantity Ns of the NOx stored by the NOx storage catalyst 20 on the assumption that the entire production quantity N of the NOx calculated at Step S10 is stored by the NOx storage catalyst 20.

At following Step S14, it is determined whether the storage quantity Ns of the NOx calculated at Step S12 is "equal to or greater than" a predetermined value N1. Thus, it is determined whether the NOx storage catalyst 20 is under a predetermined condition that storage of the NOx with the NOx storage catalyst 20 is difficult. For example, the storage of the NOx with the NOx storage catalyst 20 becomes difficult if the quantity Ns of the NOx stored in the NOx storage catalyst 20 substantially coincides with a quantity the NOx storage catalyst 20 can store.

If the result of the determination at Step S14 is YES, the injection nozzle 24 is operated to inject the aqueous urea solution into the exhaust passage 16 at Step S16. At the same time as the injection of the aqueous urea solution, fuel injection control is switched from a normal mode to a mode for decomposing and discharging the NOx stored in the NOx storage catalyst 20. In the switched mode, a pilot injection may be performed before a main injection of the fuel and the main injection may be performed at injection timing later than timing of the normal mode. In addition, in the switched mode, a post-injection may be performed at timing, at which the fuel is not ignited, following the main injection.

If the result of the determination at Step S14 is NO or if the processing at Step S16 is completed, this series of processing is ended once.

By using the aqueous urea solution and the selective reduction catalyst 22 in this manner, the NOx stored in the NOx storage catalyst 20 can be surely purified before the quantity of the NOx stored in the NOx storage catalyst 20 becomes excessive. The number of service stations supplying the aqueous urea solution to the vehicles is smaller than the number of service stations supplying diesel oil as fuel of the engine 2. Therefore, it is relatively difficult to replenish the aqueous urea solution when it fails.

Therefore, in this example embodiment, it is determined whether the quantity of the aqueous urea solution remaining in the vehicle is sufficient for the vehicle to reach the service station based on running conditions between the service station and the vehicle. If it is determined that the quantity of the remaining aqueous urea solution is insufficient, an operating condition of the vehicle for enabling the vehicle to reach the service station without running short of the aqueous urea solution is calculated based on the running conditions and the quantity of the remaining aqueous urea solution. Thus, the system performs travel assist to ensure that the user can bring the vehicle to the service station that can supply the aqueous urea solution.

Figure 4:
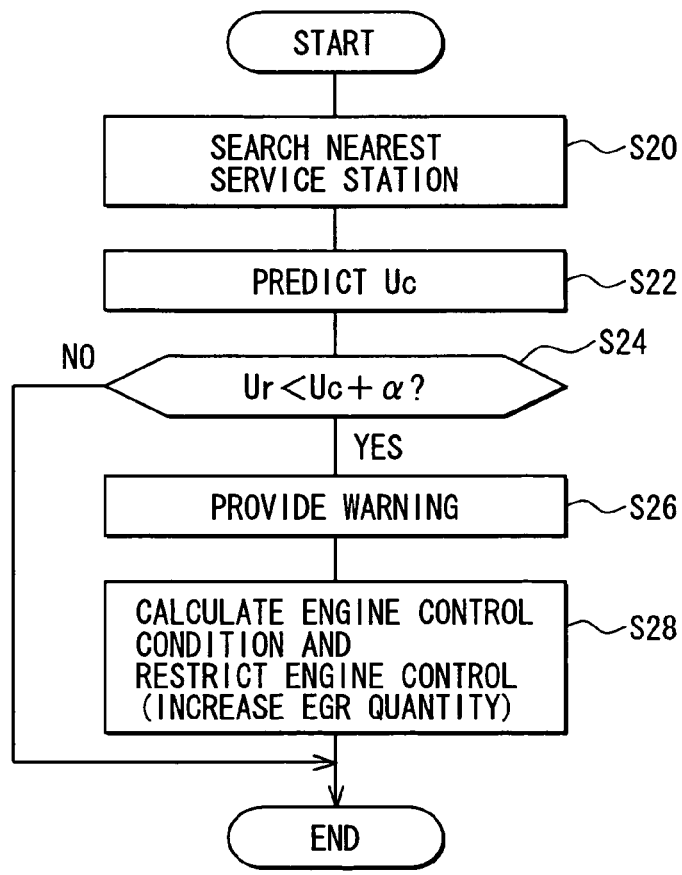
FIG. 4 is a flowchart showing processing steps of travel assist according to the FIG. 1 embodiment.

Processing steps of the travel assist for assisting the user to drive the vehicle without running short of the aqueous urea solution are shown by a flowchart of FIG. 4. The electronic control device B6 repeatedly performs the processing shown by the flowchart of FIG. 4 in a predetermined cycle, for example.

Figure 5:
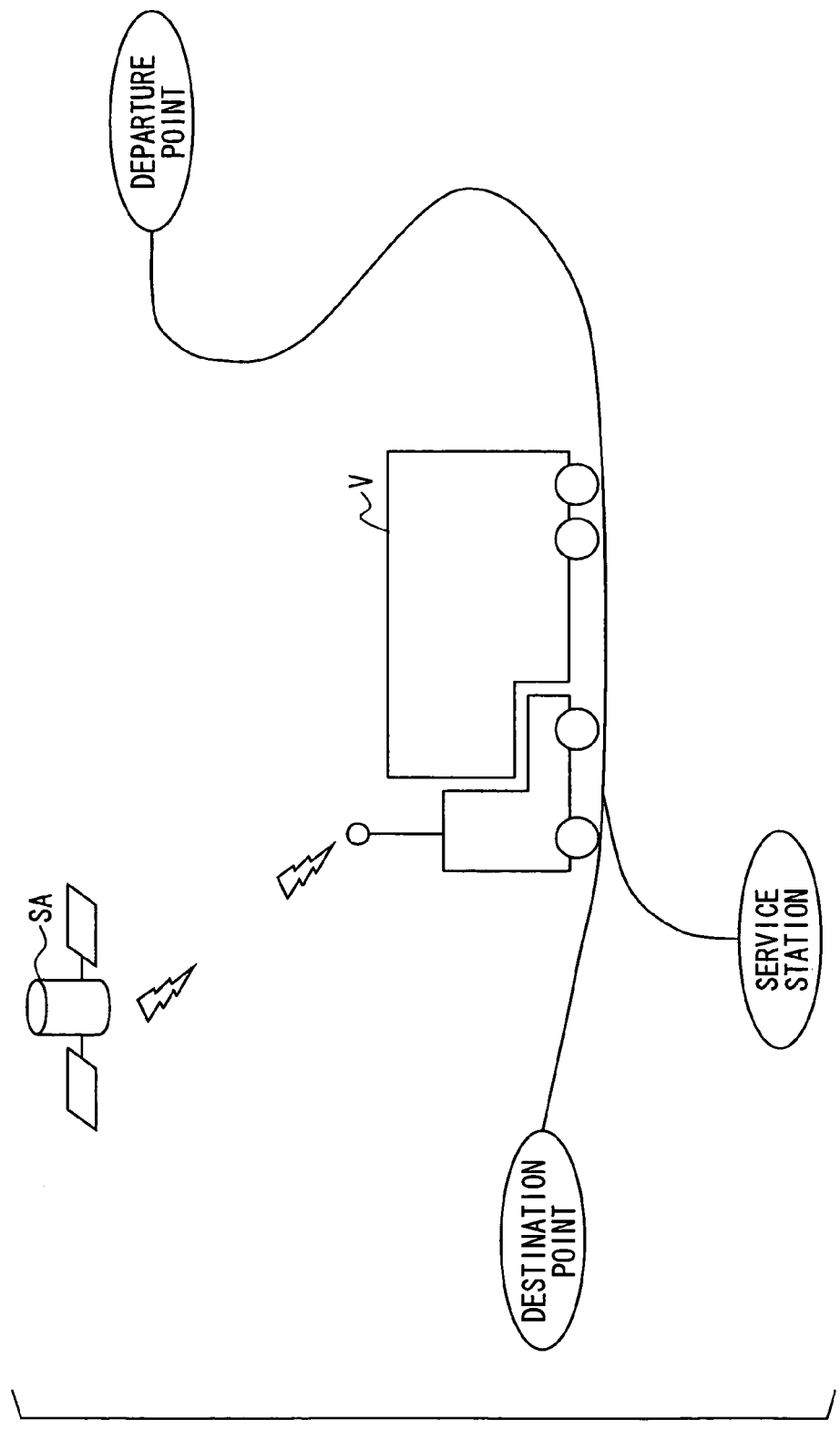
FIG. 5 is a schematic diagram showing a vehicle and a communication satellite according to the FIG. 1 embodiment.

First in the series of this processing, at Step S20, the nearest service station is searched based on navigation information. The navigation information is obtained from the navigation system B16 shown in FIG. 1. For example, the navigation information is obtained by the GPS as shown in FIG. 5. In FIG. 5, a situation in which a vehicle V (in particular, the navigation system B16) is communicating with a communication satellite SA is schematically illustrated.

At following Step S22, consumption Uc of the aqueous urea solution consumed until the searched service station is reached is predicted (calculated) based on the navigation information. The consumption Uc of the aqueous urea solution consumed until the service station is reached is calculated based on the running conditions between the searched service station and the vehicle. The running conditions should preferably include not only a distance between the service station and the vehicle but also conditions such as an altitude difference between the service station and the vehicle, an altitude change of a road surface between the service station and the vehicle, and states of atmosphere (wind speed, air temperature and the like) surrounding the vehicle. The aqueous urea solution consumption Uc is the minimum value of consumption of the aqueous urea solution. The aqueous urea solution consumption Uc means a consumption of the aqueous urea solution in the case where drive control of the engine 2 is performed to minimize the consumption of the aqueous urea solution without taking into consideration a variation in the consumption of the aqueous urea solution due to driving propensity of the user.

If the aqueous urea solution consumption Uc is calculated at Step S22, it is determined whether the present quantity Ur of the remaining aqueous urea solution is enough to reach the searched service station. For example, it is determined whether the remaining aqueous urea solution quantity Ur is less than a value provided by adding a predetermined value $\alpha$ to the predicted aqueous urea solution consumption Uc. The predetermined value $\alpha$ is set greater than a variation in the aqueous urea solution consumption Uc due to the driving propensity of the user. Thus, at Step S24, it is determined whether the remaining quantity Ur of the aqueous urea solution is enough for the vehicle to reach the searched service station with a margin without running short of the aqueous urea solution no matter how the user operates the vehicle.

If the result of the determination at Step S24 is YES (Ur<Uc+$\alpha$), a warning is provided to the user at Step S26. For example, the navigation system B16 performs audio announcement.

At following Step S28, a control condition of the engine 2 for enabling the vehicle to reach the service station without running short of the aqueous urea solution is calculated. Then, the engine 2 is controlled based on the calculation result. For example, a quantity (EGR quantity) of the exhaust gas recirculated to the intake passage 4 through the exhaust gas recirculation passage 40 shown in FIG. 2 is increased. Thus, concentration of the NOx contained in the exhaust gas discharged to the exhaust passage 16 is reduced. The reduction of the NOx concentration reduces speed of increase of the NOx stored in the NOx storage catalyst 20 and retards the timing (or reduces frequency) for performing the processing shown by the flowchart of FIG. 3.

A mode of control for increasing the EGR quantity is variably set in accordance with the running conditions or the aqueous urea solution remaining quantity Ur. A degree of the increasing control of the EGR quantity is increased as the aqueous urea solution remaining quantity Ur approaches the predicted aqueous urea solution consumption Uc. The degree of the increasing control of the EGR quantity is decreased as the aqueous urea solution remaining quantity Ur is larger compared to the predicted aqueous urea solution consumption Uc.

Figure 6:
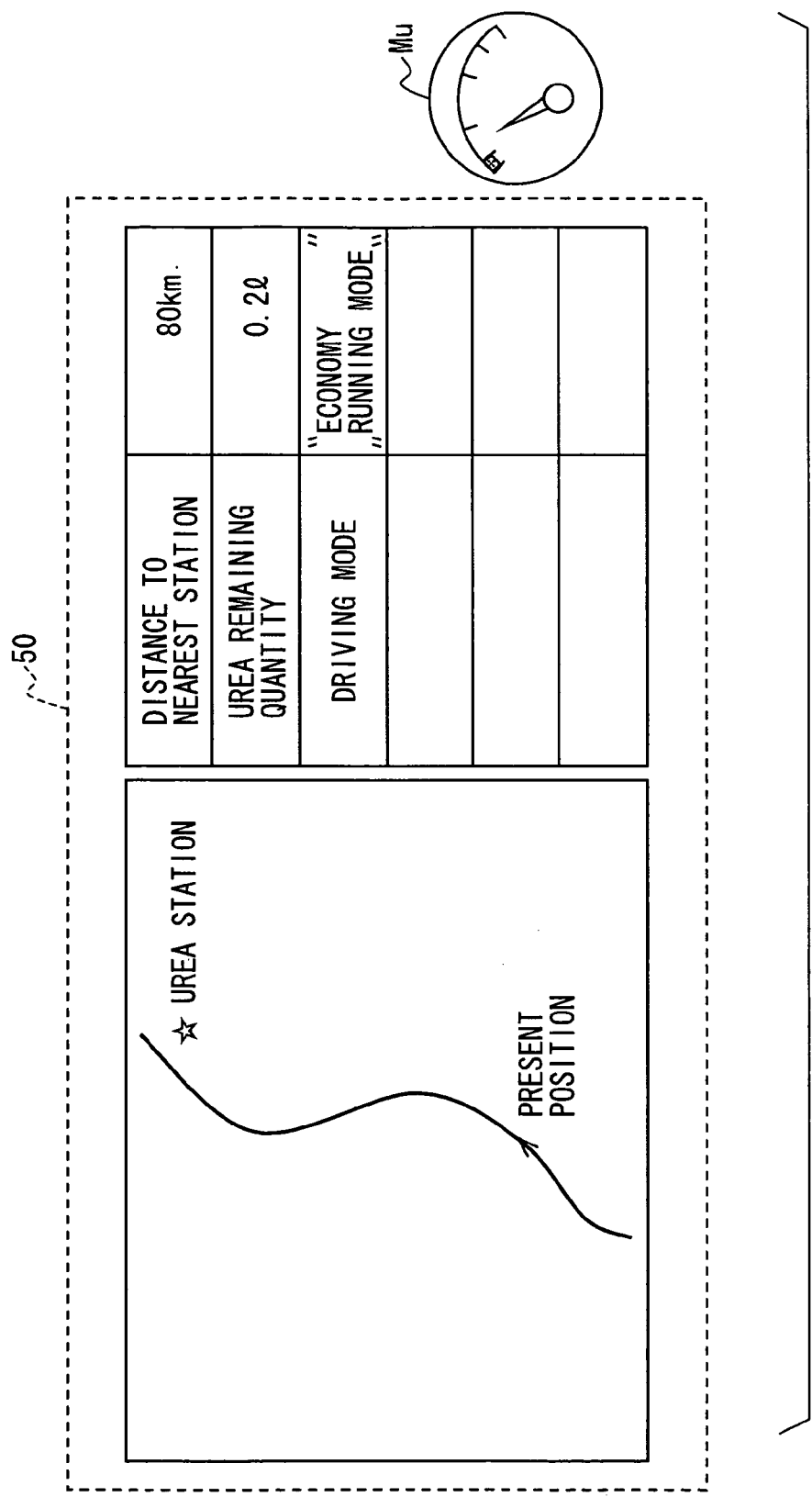
FIG. 6 is a diagram showing a display of a navigation system and an aqueous urea solution meter according to the FIG. 1 embodiment.

If the increasing control of the EGR quantity is performed in this manner, it is announces to the user. For example, as shown in FIG. 6, a lamp indicating an economy running mode is lit on a display 50 of the navigation system B16 shown in FIG. 1. An aqueous urea solution meter Mu shown in FIG. 6 indicates the remaining quantity of the aqueous urea solution stored in the vehicle.

The navigation information should preferably include information about business hours of the service station. Thus, a service station that will be operating when the vehicle reaches there can be searched as the nearest station instead of searching a service station simply nearest to the vehicle as the nearest station.

If the result of the determination at Step S24 is NO (the aqueous urea solution remaining quantity is enough) or if the processing at Step S28 is completed, the series of the processing is ended once.

This example embodiment can provide following effects.

(a) The operating condition of the vehicle enabling the vehicle to reach the service station without running short of the aqueous urea solution is calculated based on the information about the running conditions between the service station and the vehicle and the quantity of the aqueous urea solution remaining in the vehicle. Thus, suitable assist for the vehicle to travel to the service station can be provided independently of the driving propensity of the user.

(b) The above calculation is performed when the quantity of the remaining aqueous urea solution is insufficient for the vehicle to reach the service station based on the information about the running conditions between the service station and the vehicle. Thus, suitable travel assist can be provided so that the vehicle can reach the service station without running short of the aqueous urea solution.

(c) The EGR quantity is restricted to a larger value based on the above calculation result. Thus, the consumption of the aqueous urea solution for purifying the NOx can be reduced. As a result, the travel assist can be provided so that the vehicle can surely reach the service station without running short of the aqueous urea solution. Specifically, the restriction of the EGR quantity cannot be performed by operation of the user. Therefore, it is specifically efficient to perform the restriction of the EGR quantity as control of the engine 2 by the electronic control device B6.

In order to enable the vehicle to reach the service station without running short of the aqueous urea solution, the quantity of the aqueous urea solution injected through the injection nozzle 24 may be reduced. However, in this case, emission characteristics will be deteriorated. In contrast, the restriction of the EGR quantity to a larger value can reduce the consumption of the aqueous urea solution without deteriorating the emission characteristics.

(d) The mode of the EGR quantity increasing control is variably set in accordance with the running conditions between the service station and the vehicle or the remaining quantity of the aqueous urea solution. Accordingly, suitable travel assist can be achieved.

(e) When the control restriction of the engine 2 is performed, it is announced. Thus, the user can recognize that the control restriction is performed.

(f) The information about the running conditions between the service station and the vehicle includes a distance between the service station and the vehicle, an altitude difference between the service station and the vehicle, an altitude change of a road surface between the service station and the vehicle, and states of the atmosphere surrounding the vehicle. Thus, the operating condition of the vehicle enabling the vehicle to reach the service station without running short of the aqueous urea solution can be suitably calculated.

(g) The travel assist is performed so that the vehicle can travel to the aqueous urea solution service station without running short of the aqueous urea solution used for purifying the NOx. The effects (a) to (e) are suitably exerted because the number of the aqueous urea solution stations is smaller than that of the diesel oil service stations.

Next, a travel assist system according to a second example embodiment of the present invention will be explained with reference to FIG. 7.

The travel assist system of this example embodiment assists the vehicle to travel to the service station without running short of diesel oil as fuel of the engine 2.

Figure 7:
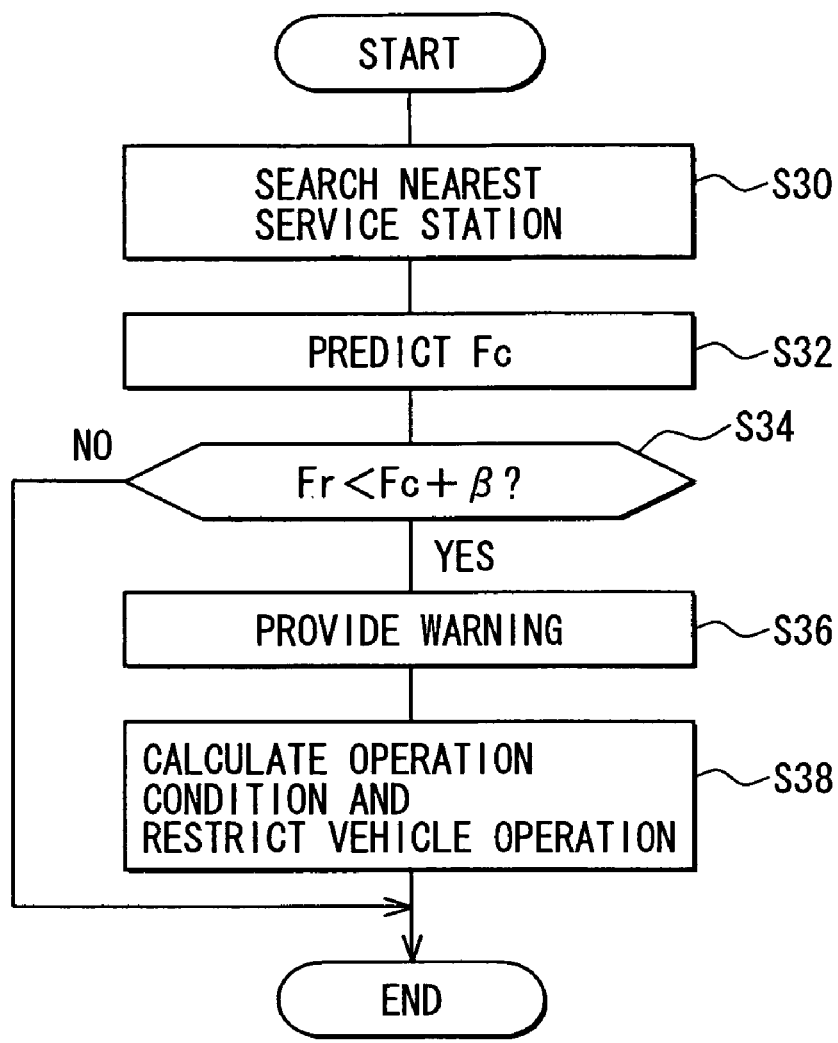
FIG. 7 is a flowchart showing processing steps of travel assist according to a second example embodiment of the present invention.

A flowchart of FIG. 7 shows processing steps of the travel assist according to this example embodiment. The electronic control device B6 repeatedly performs the processing shown by the flowchart of FIG. 7 in a predetermined cycle, for example.

First in the series of this processing, at Step S30, the nearest service station is searched based on navigation information. At following Step S32, a consumption Fc of the fuel consumed until the searched service station is reached is predicted (calculated) based on the navigation information. The consumption Fc of the fuel consumed until the searched service station is reached is calculated based on the running conditions between the service station and the vehicle. The fuel consumption Fc is the minimum value of consumption of the fuel. The fuel consumption Fc means the consumption of the fuel in the case where the vehicle is operated to minimize the fuel consumption without taking into consideration a variation in the fuel consumption due to driving propensity of the user.

If the fuel consumption Fc is calculated at Step S32, it is determined whether the present quantity Fr of the remaining fuel is enough for the vehicle to reach the searched service station at Step S34. For example, it is determined whether the remaining fuel quantity Fr is less than a value provided by adding a predetermined value $\beta$ to the predicted fuel consumption Fc. The predetermined value $\beta$ is set greater than a variation in the fuel consumption due to the driving propensity of the user. Thus, at Step S34, it is determined whether the remaining quantity Fr is enough for the vehicle to reach the service station with a margin without running short of the fuel no matter how the user operates the vehicle.

If the result of the determination at Step S34 is YES (Fr<Fc+$\beta$), a warning is provided to the user at Step S36.

At following Step S38, operation conditions of the vehicle enabling the vehicle to reach the service station without running short of the fuel are calculated. The operation of the vehicle is restricted based on the calculation result. For example, acceleration and average speed of the vehicle are restricted.

Figure 8A:
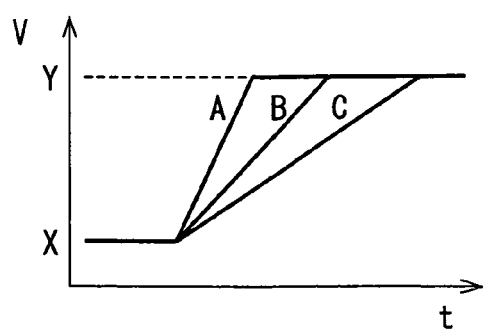
FIG. 8A is a graph showing acceleration characteristics of a vehicle.
Figure 8B:
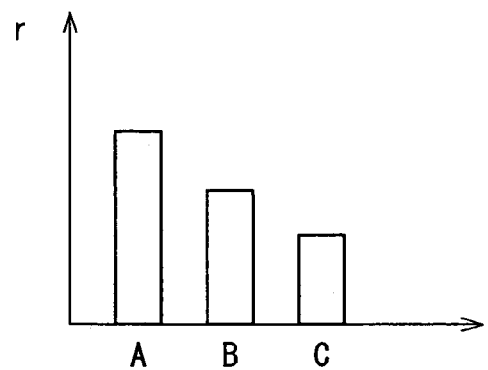
FIG. 8B is a graph showing a relationship between acceleration and a fuel consumption of the vehicle.

Graph of FIGS. 8A and 8B schematically show a relationship between acceleration characteristics and a fuel consumption rate of the vehicle. The acceleration A is greater than the acceleration B, which is greater than the acceleration C in FIGS. 8A and 8B. Generally, as shown in FIGS. 8A and 8B, the fuel consumption rate r decreases as the acceleration from certain vehicle speed X to higher vehicle speed Y decreases. Therefore, in this example embodiment, processing for restricting rapid acceleration is performed. For example, processing for restricting rapid increase of output torque of the engine 2 is performed. For example, processing for restricting rapid increase of a fuel quantity injected through the fuel injection valve 10 even if the accelerator pedal is pressed down rapidly is performed.

Figure 9A:
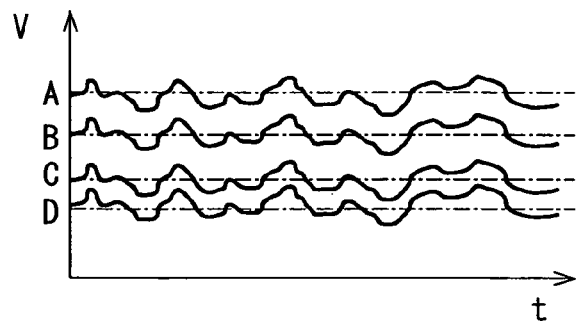
FIG. 9A is a graph showing vehicle speed.
Figure 9B:
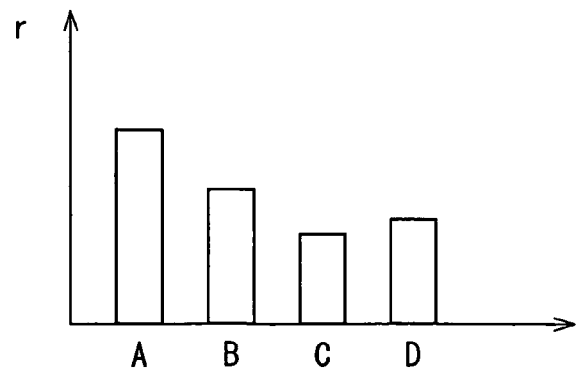
FIG. 9B is a graphs showing a relationship between an average vehicle speed and a fuel consumption rate.

Graphs of FIGS. 9A and 9B schematically show a relationship between the average vehicle speed and the fuel consumption rate r. The average vehicle speed A is higher than the average vehicle speed B, which is higher than the average vehicle speed C. The average vehicle speed C is higher than the average vehicle speed D. Generally, as shown in FIGS. 9A and 9B, there is the most efficient average vehicle speed that minimizes the fuel consumption rate r according to the relationship between the average vehicle speed and the fuel consumption rate r. Therefore, in this example embodiment, processing for restricting the vehicle speed V to the most efficient vehicle speed is performed. The most efficient vehicle speed may be obtained based on data made by serially collecting data about the relationship between the average vehicle speed and the fuel consumption rate r while the vehicle is running.

Figure 10:
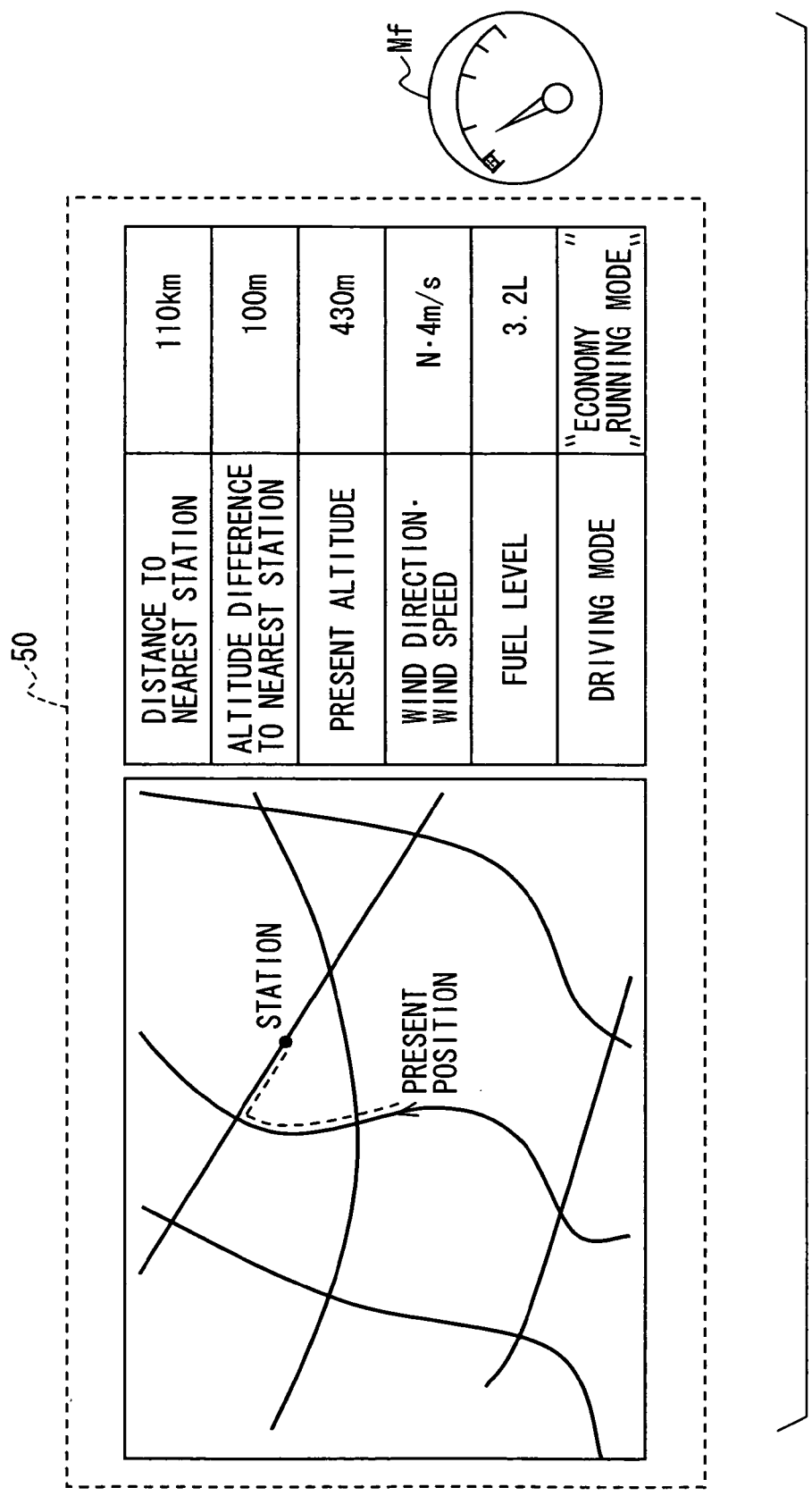
FIG. 10 is a diagram showing a display of a navigation system and a fuel level meter according to the FIG. 7 embodiment.
Figure 11:
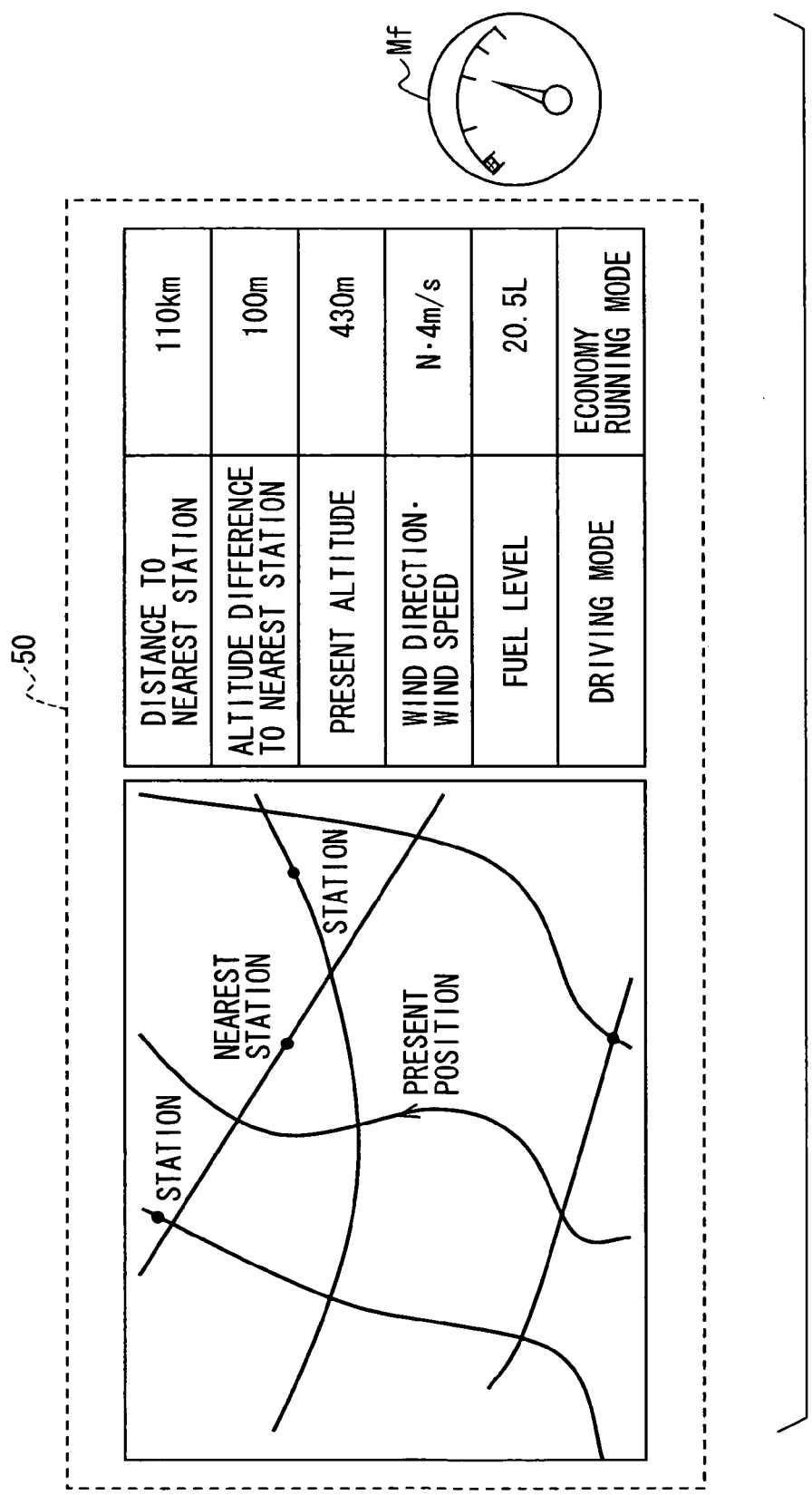
FIG. 11 is a diagram showing a display of a navigation system and a fuel level meter according to the FIG. 7 embodiment.

A degree of the acceleration restriction or average vehicle speed restriction is variably set in accordance with the running conditions or the fuel remaining quantity Fr. The restriction should be preferably performed after the warning is provided at Step S36 and the user approves the restriction. Even in the case where the user approves the restriction, information indicating that the restriction is being performed is indicated (sign "economy running mode" is lit) on the display 50 when the restriction is performed as shown in FIG. 10. A fuel level meter Mf in FIG. 10 indicates the quantity of the fuel remaining in the vehicle. Another indication example of the display 50 of the navigation system B16 at the time when the fuel is sufficient and the operation restriction is not performed is shown in FIG. 11. The sign "economy running mode" is unlit in FIG. 11.

The travel assist system according to this example embodiment can also achieve effects similar to the effects (a), (b) and (d) to (f) of the first example embodiment.

Next, a travel assist system according to a third example embodiment of the present invention will be explained with reference to FIG. 12.

In this example embodiment, operation conditions of the vehicle enabling the vehicle to reach the service station without running short of the fuel are calculated. Thereafter, instead of performing the operation restriction, restriction information about the operation of the vehicle for reaching the service station without running short of the fuel is announce to the user based on the calculation result.

Figure 12:
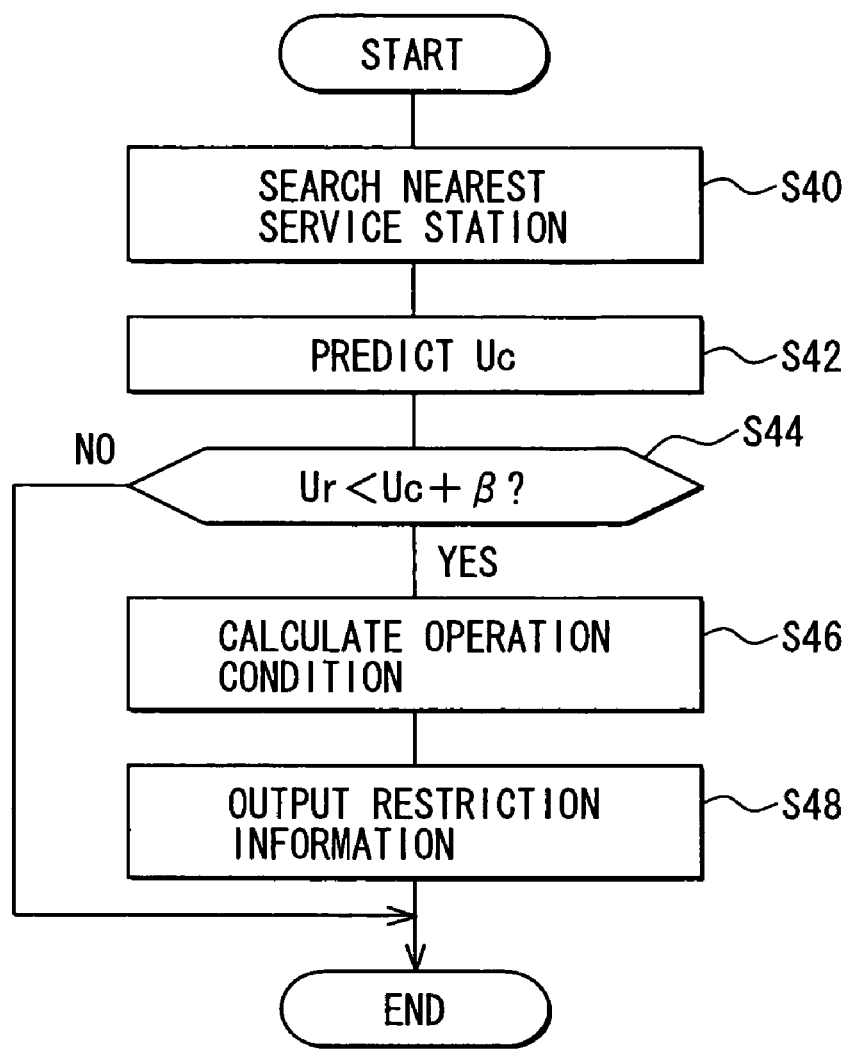
FIG. 12 is a flowchart showing processing steps of travel assist according to a third example embodiment of the present invention.

A flowchart of FIG. 12 shows processing steps of the travel assist according to this example embodiment. The electronic control device B6 repeatedly performs the processing shown by the flowchart of FIG. 12 in a predetermined cycle, for example.

Processing similar to that of Steps S30 to S34 of the flowchart shown in FIG. 7 is performed at Steps S40 to S44 in the series of processing of the flowchart shown in FIG. 12. At following Step S46, operation conditions enabling the vehicle to reach the service station without running short of the fuel are calculated. At Step S48, restriction information about the operation of the vehicle is output through the display 50 and the like based on the calculation result. The restriction information is variably set in accordance with the running conditions or the fuel remaining quantity.

The travel assist system according to this example embodiment can also achieve effects similar to the effects (a), (b) and (f) of the first example embodiment and following effects.

(h) The operation conditions enabling the vehicle to reach the service station without running short of the fuel are calculated, and the restriction information about the operation of the vehicle enabling the vehicle to reach the service station without running short of the fuel is announced based on the calculation result. Thus, the user can surely bring the vehicle to the service station by using the restriction information. Even in the case where it is difficult to reach the service station without running short of the fuel due to the driving propensity of the user, the user can correct his/her driving propensity by operating the vehicle in accordance with the restriction information. Thus, the vehicle can reach the service station without running short of the fuel.

(i) The restriction information is variably set in accordance with the running conditions between the service station and the vehicle and the quantity of the fuel remaining in the vehicle. Thus, the travel assist system can suitably assist the user to drive the vehicle to the service station.

The control restriction of the engine 2 of the first example embodiment is not limited to the increasing control of the EGR quantity. For example, control for decreasing the fuel injection quantity may be performed.

Effects similar to the effects (a) to (c) of the first example embodiment can be achieved even if the control mode of the engine 2 or the operation mode of the vehicle are not variably set in accordance with the running conditions, the aqueous urea solution remaining quantity or the fuel remaining quantity in the first or second example embodiment.

Effects similar to the effects (a) to (c) of the first example embodiment can be achieved even if the restriction information about the operation of the vehicle is not variably set in accordance with the running conditions or the fuel remaining quantity in the third example embodiment.

The travel assist system is not limited to the system assisting the travel of the vehicle having the diesel engine. For example, the travel assist system may assist travel of a vehicle having a gasoline engine or travel of an electric motorcar.

The supplied material consumed during the running of the vehicle and supplied at the supply point is not limited to the aqueous urea solution or the diesel oil. For example, gasoline, liquid hydrogen, compressed natural gas (CNG) and the like may be employed as the supplied material.

The method for determining whether the quantity of the supplied material remaining in the vehicle is enough for the vehicle to reach the supply point is not limited to the methods described in the above example embodiments. For example, in the processing shown in FIG. 4, the above determination may be performed based on an average fuel consumption rate obtained while the vehicle is running.

The travel assist system is not limited to the system that announces the restriction information or that restricts the operation when it is determined that the quantity of the supplied material remaining in the vehicle is not enough for the vehicle to reach the nearest service station. For example, when the supplied material is insufficient for the vehicle to reach any one out of multiple supply points, the travel assist system may announce restriction information enabling the vehicle to reach these supply points. Thus, the system can suitably assist the user to reach an arbitrary supply point without running short of the supplied material.

The present invention should not be limited to the disclosed embodiments, but may be implemented in many other ways without departing from the spirit of the invention.

What is claimed is:

1. A travel assist system that manages a supplied material consumed through running of a vehicle and supplied at a supply point, the travel assist system comprising:

a calculating device that calculates an operating condition of the vehicle enabling the vehicle to reach the supply point without running short of the supplied material based on information about a running condition between the supply point and the vehicle and a quantity of the supplied material remaining in the vehicle.

2. The travel assist system as in claim 1, wherein;

the calculating device determines whether the quantity of the supplied material remaining in the vehicle is enough for the vehicle to reach the supply point based on the information about the running condition between the supply point and the vehicle, and the calculating device performs the calculation if the calculating device determines that the quantity of the supplied material is not enough for the vehicle to reach the supply point.

3. The travel assist system as in claim 1, further comprising:

a first restriction announcing device that announces restriction information about operation of the vehicle to reach the supply point based on the calculation result of the calculating device.

4. The travel assist system as in claim 3, wherein the restriction information is variably set in accordance with at least one of the running condition between the supply point and the vehicle and the quantity of the supplied material remaining in the vehicle.

5. The travel assist system as in claim 3, wherein;
the supplied material is fuel of a motor of the vehicle, and
the restriction information is information about at least one of a manipulation mode of an accelerator of the vehicle and average speed of the vehicle.

6. The travel assist system as in claim 1, further comprising:
a restricting device that restricts operation of the vehicle based on the calculation result of the calculating device.

7. The travel assist system as in claim 6, wherein the restriction mode of the vehicle is variably set in accordance with at least one of the running condition between the supply point and the vehicle and the quantity of the supplied material remaining in the vehicle.

8. The travel assist system as in claim 6, further comprising:
a second restriction announcing device that announces restriction of the operation of the vehicle.

9. The travel assist system as in claim 6, wherein the restriction of the operation is performed as control restriction of a motor of the vehicle.

10. The travel assist system as in claim 9, wherein;
the motor is an internal combustion engine having an exhaust gas recirculation system that recirculates exhaust gas from an exhaust system into an intake system,
the supplied material is aqueous urea solution for purifying nitrogen oxides contained in the exhaust gas, and
the control restriction is restriction of a quantity of the exhaust gas recirculated into the intake system to a larger value.

11. The travel assist system as in claim 6, wherein;
the supplied material is fuel of a motor of the vehicle, and
the restriction of the operation is restriction of at least one of acceleration and average speed of the vehicle.

12. The travel assist system as in claim 1, wherein the supplied material is at least one of gasoline, diesel oil, aqueous urea solution for purifying nitrogen oxides, liquid hydrogen and compressed natural gas.

13. The travel assist system as in claim 1, wherein the information about the running condition between the supply point and the vehicle includes at least one of a distance between the supply point and the vehicle, an altitude difference between the supply point and the vehicle, an altitude change of a road surface between the supply point and the vehicle, and a state of atmosphere surrounding the vehicle.

* * * * *